United States Patent
Brown, Jr. et al.

(10) Patent No.: US 9,017,004 B1
(45) Date of Patent: Apr. 28, 2015

(54) LOADING AND TRANSPORTING RACK SYSTEM

(76) Inventors: Ronald L. Brown, Jr., Avinger, TX (US); Richard Kincaid, Jefferson, TX (US)

( * ) Notice: Subject to any disclaimer, the term of this patent is extended or adjusted under 35 U.S.C. 154(b) by 532 days.

(21) Appl. No.: 13/368,511

(22) Filed: Feb. 8, 2012

(51) Int. Cl.
- *B60P 1/00* (2006.01)
- *B60P 3/07* (2006.01)
- *B60P 1/43* (2006.01)

(52) U.S. Cl.
CPC .. *B60P 3/07* (2013.01); *B60P 1/435* (2013.01)

(58) Field of Classification Search
CPC .................................. B60P 3/07; B60P 1/435
USPC ................... 414/537; 14/71.1; 224/402, 403; 296/61.3; 410/3, 4, 7, 24
See application file for complete search history.

(56) References Cited

U.S. PATENT DOCUMENTS

| | | | | |
|---|---|---|---|---|
| 3,912,139 | A * | 10/1975 | Bowman | 410/3 |
| 4,874,284 | A | 10/1989 | New, Jr. | |
| 5,553,762 | A * | 9/1996 | Brown | 224/403 |
| 5,988,722 | A * | 11/1999 | Parri | 296/26.09 |
| D505,238 | S | 5/2005 | Robertson | |
| 6,902,033 | B2 * | 6/2005 | Berzowski | 182/127 |
| 6,913,175 | B2 * | 7/2005 | Martin | 224/403 |
| 7,150,591 | B1 | 12/2006 | Kent | |
| 7,455,489 | B1 * | 11/2008 | Klev et al. | 410/4 |
| D594,171 | S | 6/2009 | Scott | |
| 2006/0237503 | A1 * | 10/2006 | Langelier | 224/403 |
| 2008/0014068 | A1 | 1/2008 | Smith | |

* cited by examiner

*Primary Examiner* — Saul Rodriguez
*Assistant Examiner* — Mark Hageman

(57) ABSTRACT

A collapsible loading and transporting rack system for transporting a first vehicle on a second vehicle equipped with side rails. The system has a plurality of attachment rails, a plurality of support beams, a plurality of platform members, and a plurality of generally rectangular planar ramps. The rail bottom surface sets on top of a horizontal top surface, and the rail inside surface sets against a vertical inside surface of a side rail of a vehicle so equipped. The side stop tie down projects horizontally out and away from the horizontal attachment rail for securing the ramp in a horizontal position. The side stop tie down is an attachment point for securing a vehicle to the system.

4 Claims, 7 Drawing Sheets

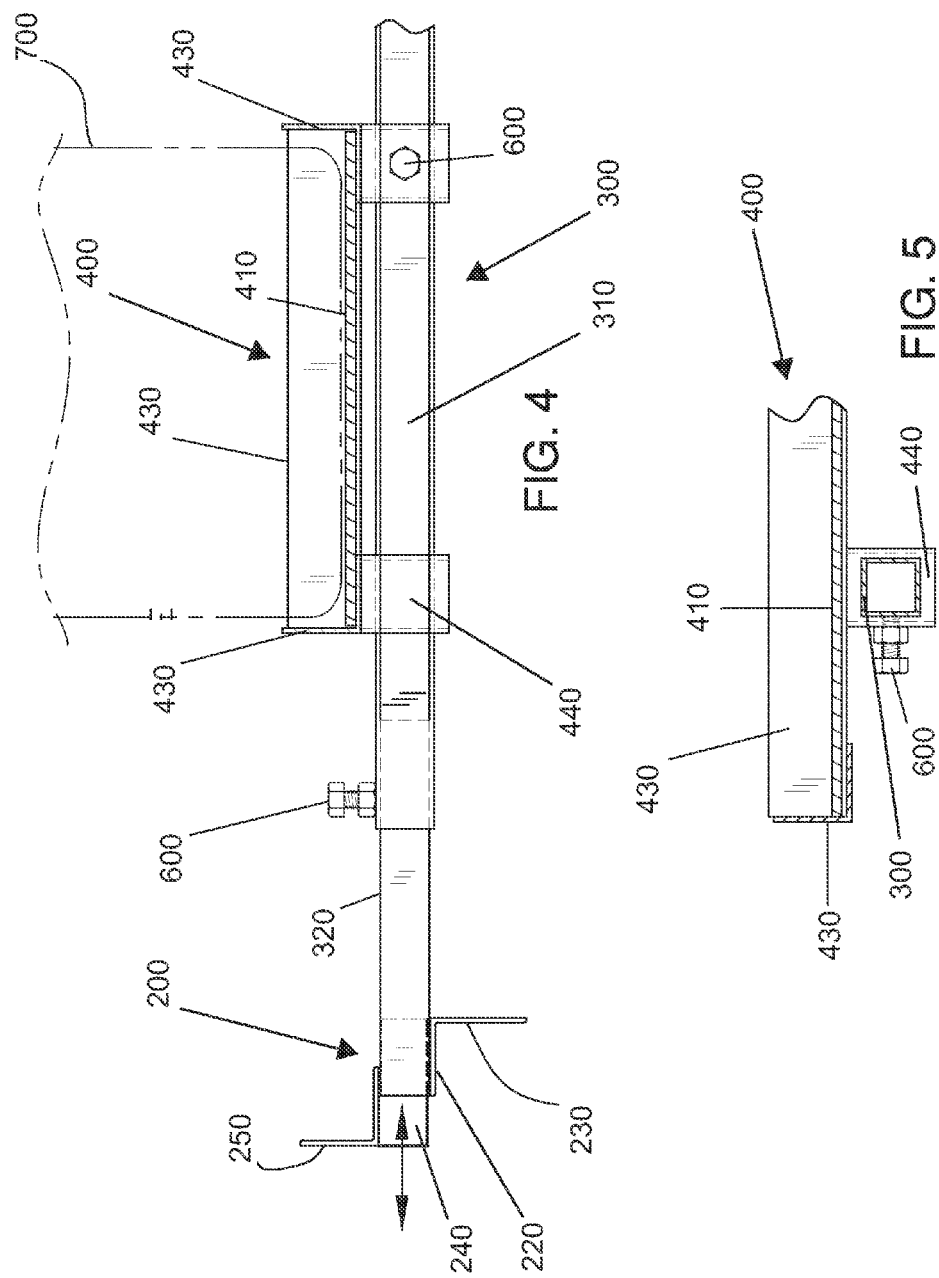

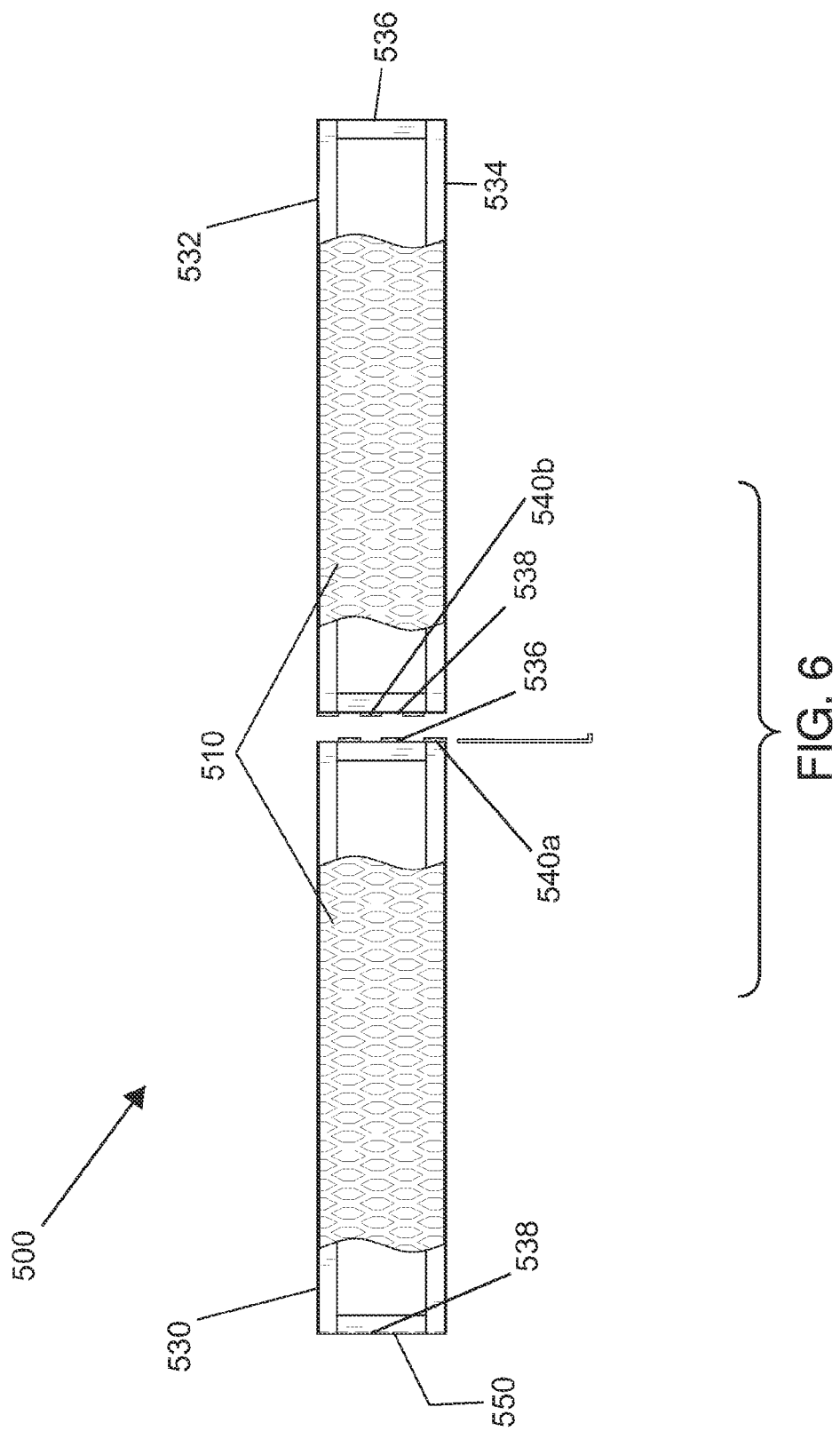

LOADING AND TRANSPORTING RACK SYSTEM

BACKGROUND OF THE INVENTION

All-terrain vehicles have been in use for many years and continue to grow in popularity, however, most all-terrain vehicles are not legal to drive on public roads and must be transported to a location before use. Commonly trailers and pickup trucks have been used for such purposes. Due to the size of a typical all-terrain vehicle, if it is transported in the bed of a pickup, there is very little room remaining in the bed for other cargo. Alternately, a trailer can be used, however this is an added expense and increases the difficulty in accessing some remote locations. The present invention teaches a novel loading and transporting rack system that safety transports an all-terrain vehicle to a location while retaining the storage area for other cargo in the bed of the pickup without the expense and restrictions of a trailer.

SUMMARY

The present invention features a collapsible loading and transporting rack system for transporting a first vehicle on a second vehicle equipped with side rails.

In some embodiments, the system has a plurality of attachment rails, a plurality of support beams, a plurality of platform members, and a plurality of generally rectangular planar ramps. In some embodiments, the rail bottom surface sets on top of a horizontal top surface, and the rail inside surface sets against a vertical inside surface of a side rail of a vehicle so equipped.

In some embodiments, the side stop tie down projects horizontally out and away from the horizontal attachment rail for securing the ramp in a horizontal position. In some embodiments, the side stop tie down is an attachment point for securing a vehicle to the system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 4 is a close view of the attachment rail, support beam and platform member of the present invention.

FIG. 5 is a side view of the platform member of the present invention.

FIG. 6 is a top view of the ramp of the present invention.

DESCRIPTION OF PREFERRED EMBODIMENTS

Figure 1:
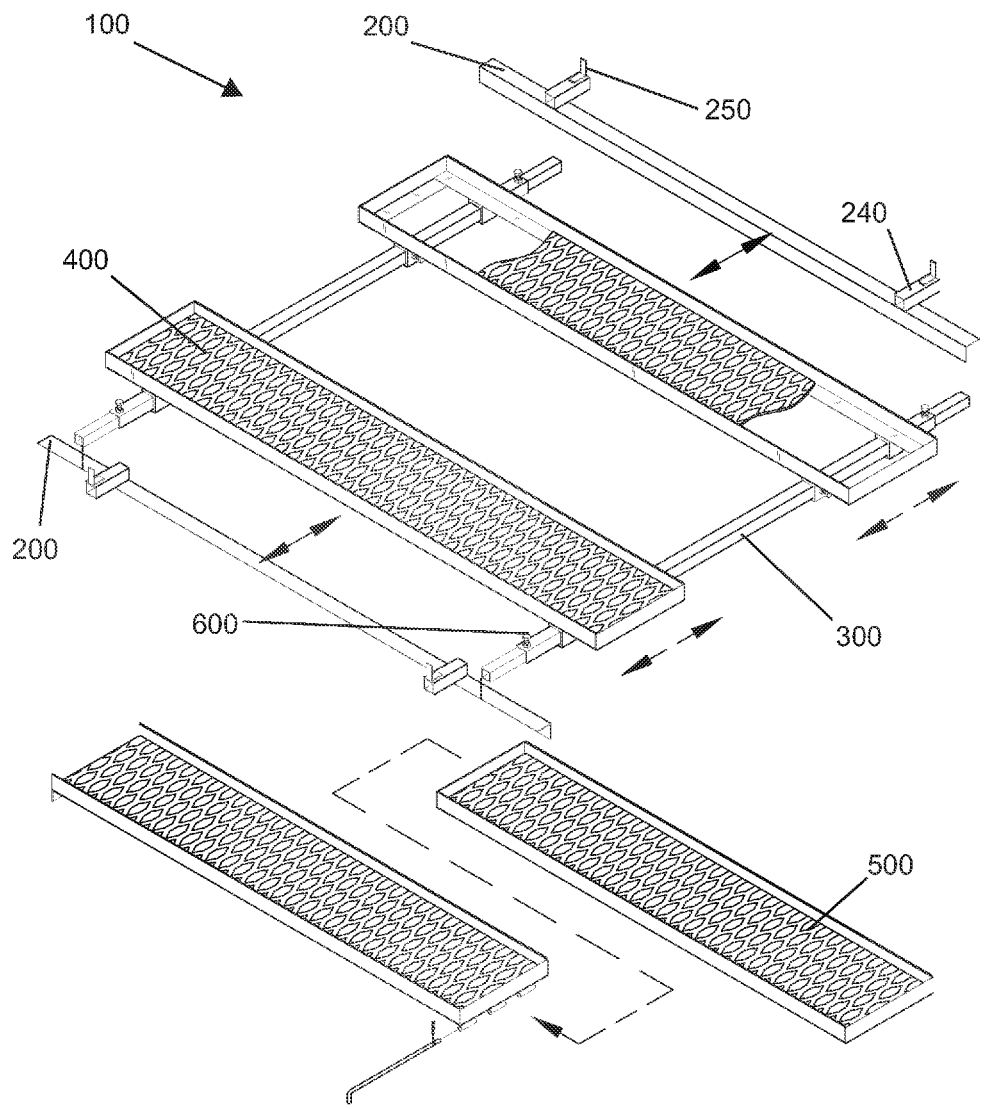
FIG. 1 is a perspective view of the rack system of the present invention.
Figure 2:
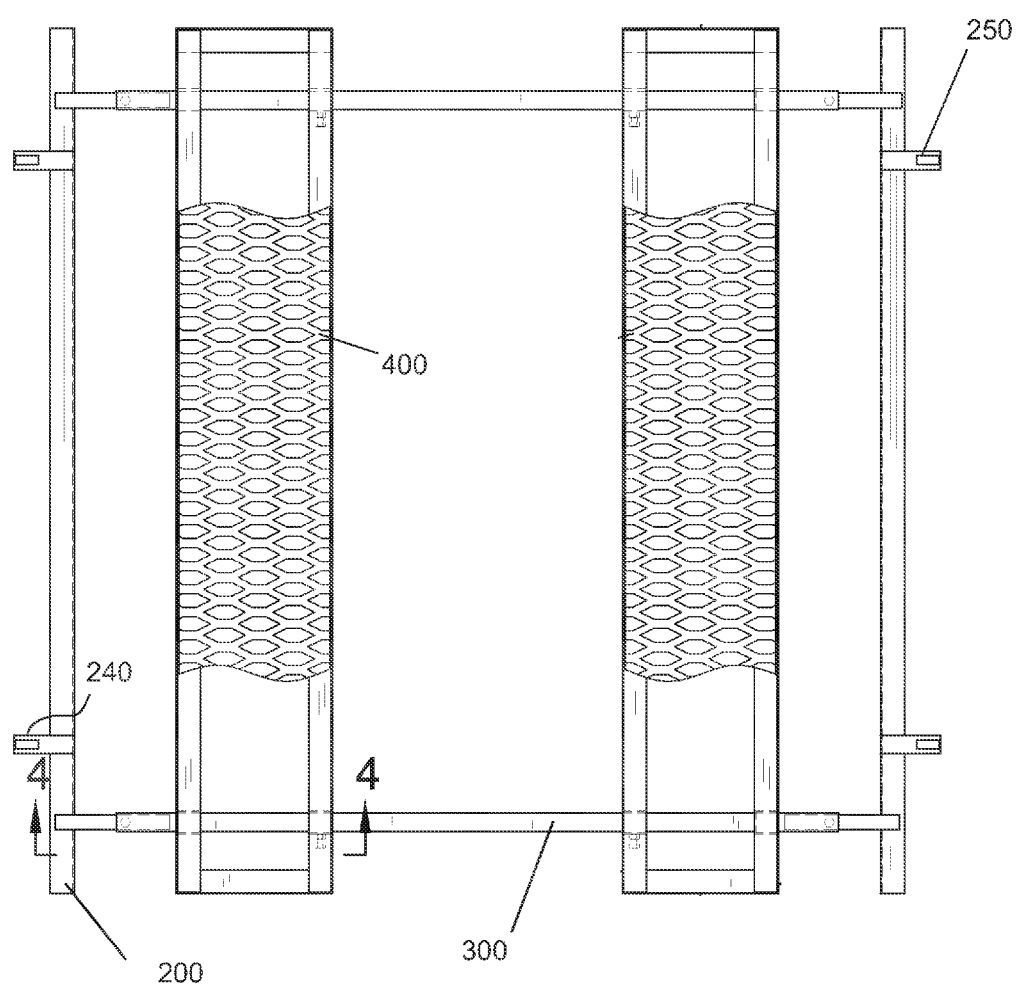
FIG. 2 is a top view of the attachment rails, support beams and platform members of the present invention.
Figure 3:
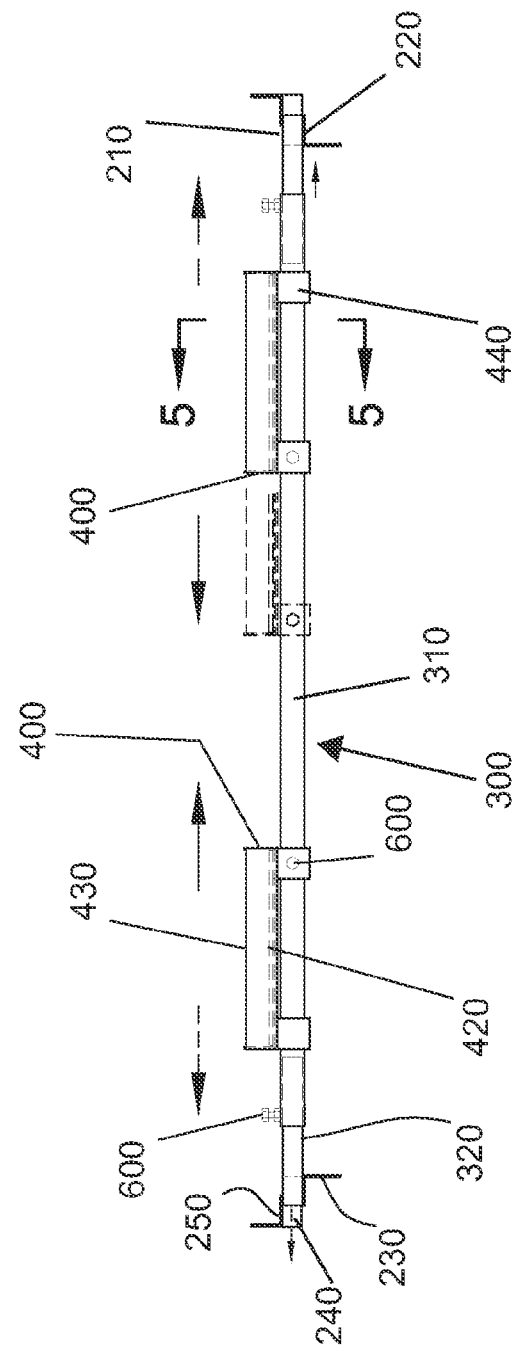
FIG. 3 is a front view of the attachment rails, support beams and platform members of the present invention.
Figure 7:
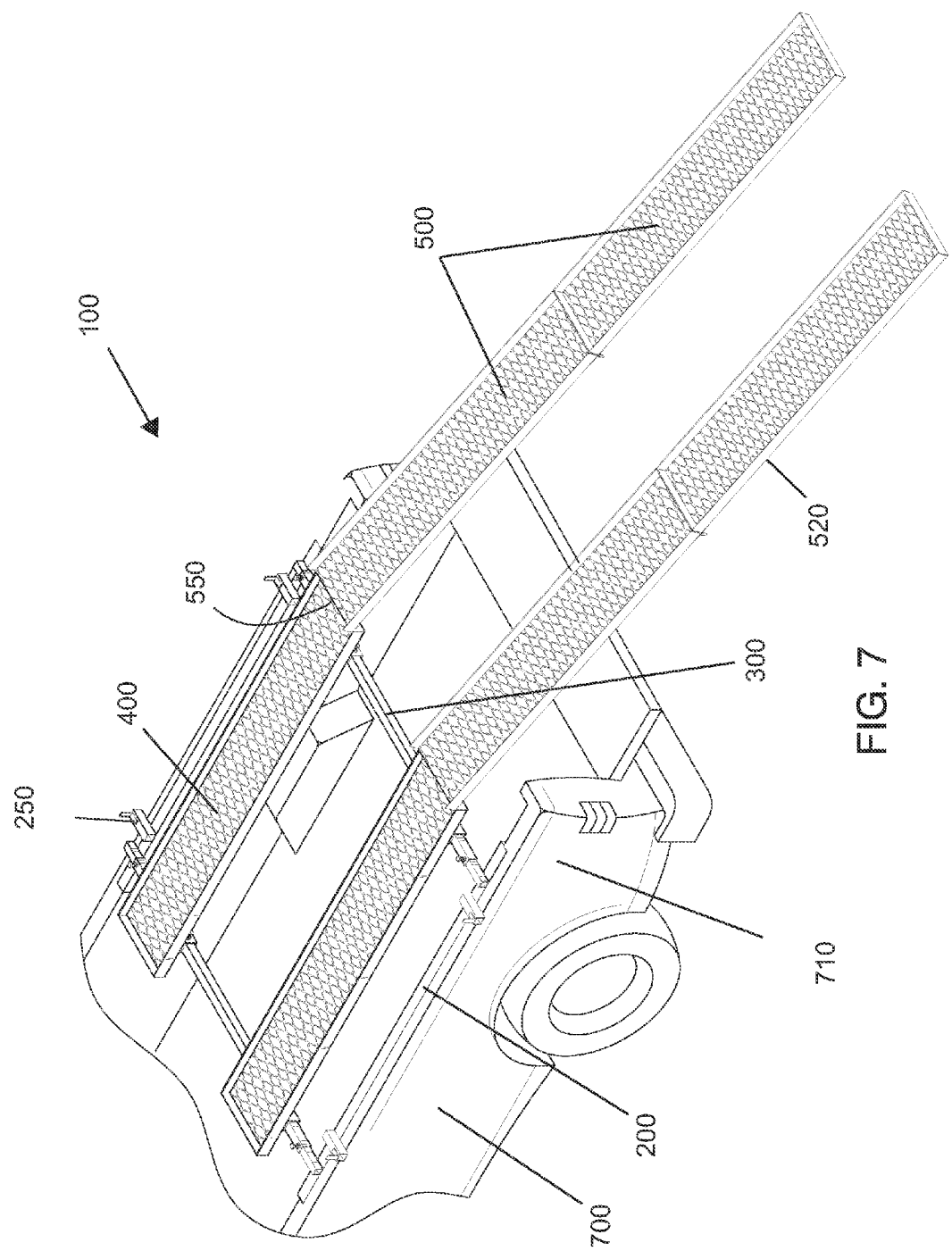
FIG. 7 is a perspective view of the rack system of the present invention.
Figure 8:
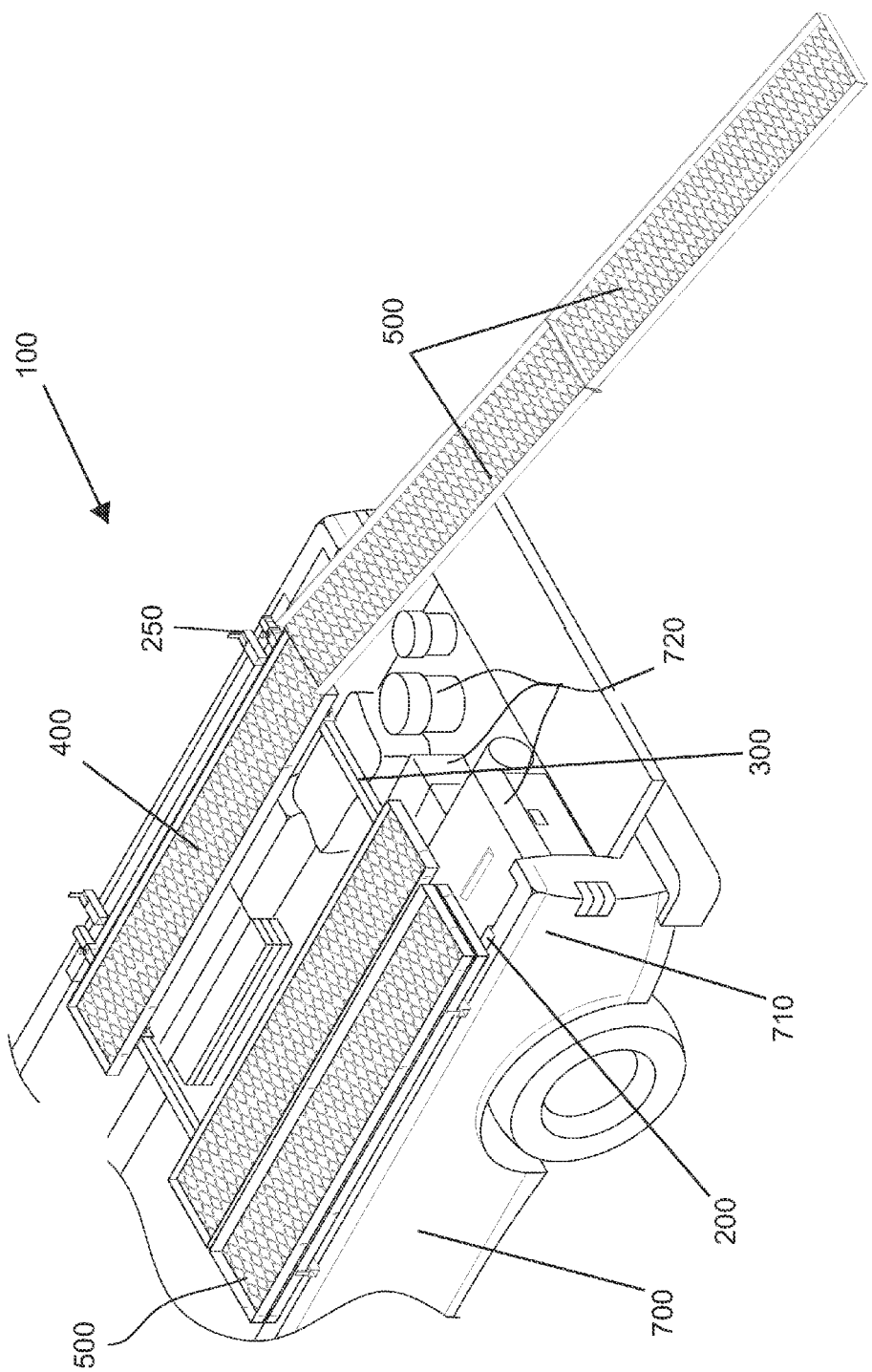
FIG. 8 is a perspective view of the rack system of the present invention.

Following is a list of elements corresponding to a particular element referred to herein:

100 System
200 Attachment rail
210 Rail top surface
220 Rail bottom surface
230 Rail inside surface
240 Support beam attachment
250 Side stop tie down
300 Support beam
310 Center beam
320 Inner beam
400 Platform member
410 Platform top surface
420 Platform bottom surface
430 Platform edge
440 Sliding member
500 Ramp
510 Ramp top surface
520 Ramp bottom surface
530 Ramp edge
532 Ramp first side edge
534 Ramp second side edge
536 Ramp back edge
538 Ramp front edge
540*a*, 540*b* First hinge member, Second hinge member
550 Attachment ledge
600 Set screw
700 Vehicle
710 Side rail
720 Cargo Referring now to FIG. 1-8, the present invention features a collapsible loading and transporting rack system (100) for transporting a first vehicle (700) on a second vehicle equipped with side rails (710) to preserve cargo (720) capacity in the first vehicle (700).

In some embodiments, the system (100) has a plurality of right-angled cross-sectional attachment rails (200), where each attachment rail (200) has a rail top surface (210), a rail bottom surface (220), a rail inside surface (230), a support beam attachment (240) affixed to the rail top surface (210), and a side stop tie down (250) affixed to the rail top surface (210).

In some embodiments, the system (100) has two right-angled cross-sectional attachment rails (200). In some embodiments, the attachment rails (200) are about 6" long. In some embodiments, the attachment rails (200) are about 12" long. In some embodiments, the attachment rails (200) are about 24" long. In some embodiments, the attachment rails (200) are about 36" long. In some embodiments, the attachment rails (200) are about 48" long. In some embodiments, the attachment rails (200) are about 60" long. In some embodiments, the attachment rails (200) are about 72" long. In some embodiments, the attachment rails (200) are about 84" long. In some embodiments, the attachment rails (200) are greater than about 84" long.

In some embodiments, the rail bottom surface (220), and the rail inside surface (230) has a slip-resistant surface. In some embodiments, the rail bottom surface (220), and the rail inside surface (230) has a rubberized insert on the surface.

In some embodiments, the attachment rail (200) is constructed from angle iron. In some embodiments, the attachment rail (200) is constructed from 1" angle iron. In some embodiments, the attachment rail (200) is constructed from 1.5" angle iron. In some embodiments, the attachment rail (400) is constructed from 2" angle iron. In some embodiments, the attachment rail (200) is constructed from square or rectangular tubing. In some embodiments, the attachment rail (200) is constructed from round tubing.

In some embodiments, the support beam attachment (240) is constructed from structural tubing. In some embodiments, the support beam attachment (240) has a set screw (600). In some embodiments, the support beam attachment (240) has a bolt, washer and nut. In some embodiments, the support beam attachment (240) has an attachment flange.

In some embodiments, the system (100) has a plurality of support beams (300), where each support beam (300) has a center beam (310) with a hollow cavity and an aperture located on an end. In some embodiments, the support beam (300) has an inner beam (320) slidably located inside the hollow cavity of the center beam (310) with an end. In some embodiments, the inner beam (320) slidably projects from and away from the aperture on the end of the center beam (310). In some embodiments, a set screw (600) is located on the center beam (310), proximal to the end of the center beam (310). In some embodiments, the set screw (600) securely engages and affixes the inner beam (320) with respect to the center beam (310).

In some embodiments, the support beam (300) has an adjustable length. In some embodiments, the support beam (300) is about 36" long. In some embodiments, the support beam (300) is about 48" long. In some embodiments, the support beam (300) is about 60" long. In some embodiments, the support beam (300) is about 72" long.

In some embodiments, the support beam (300) is constructed from square or rectangular tubing. In some embodiments, the support beam (300) is constructed from round tubing. In some embodiments, the support beam (300) is constructed from about 1" tubing. In some embodiments, the support beam (300) is constructed from about 1.5" tubing. In some embodiments, the support beam (300) is constructed from about 2" tubing.

In some embodiments, the system (100) has a plurality of generally rectangular planar platform members (400), where each platform member (400) has a platform top surface (410), a platform bottom surface (420) and a platform edge (430) with an upwardly projecting lip around the platform edge (430). In some embodiments, the platform member (400) has a rectangular cross-sectional sliding member (440) with a hollow cavity and an aperture on an end that is located on the bottom surface of the platform member (400) proximal to an end. In some embodiments, the sliding member (440) has a set screw (600) located on the sliding member (440), proximal to the end. In some embodiments, the sliding member (440) slidably attaches to and wraps fully around the support beam (300). In some embodiments, the set screw (600) securely engages and affixes a first platform member (400) to the support beam (300) at a specified location with respect to a second platform member (400).

In some embodiments, the platform top surface (410) is an expanded metal. In some embodiments, the platform top surface (410) is a plastic. In some embodiments, the platform top surface (410) is a composite material, for example, fiberglass.

In some embodiments, the lip of the platform edge (430) extends about 1". In some embodiments, the lip of the platform edge (430) extends about 1.5" In some embodiments, the lip of the platform edge (430) extends about 2".

In some embodiments, the sliding member (440) is constructed from a square or rectangular tubing. In some embodiments, the sliding member (440) is constructed from a round tubing.

In some embodiments, the system (100) has a plurality of generally rectangular planar ramps (500). In some embodiments, each ramp (500) has a ramp top surface (510), a ramp bottom surface (520), a ramp edge (530) with an upwardly projecting lip around the ramp edge (530) on a ramp first side edge (532), a ramp second side edge (534), and a ramp back edge (536). In some embodiments, the ramp has a first plurality of circularly cross-sectional hinge members (540a) with a hollow cavity and an aperture on an end located on the ramp bottom surface (520) proximal to the ramp back edge (536) and a second plurality of circularly cross-sectional hinge members (540b) comprising a hollow cavity and an aperture on an end disposed on the ramp bottom surface (520) proximal to a ramp front edge (538). In some embodiments, a pin connects a first ramp (500) and a second ramp (500) via slidably attaching the first hinge members (540a) and the second hinge members (540b).

In some embodiments, the ramp has an attachment ledge (550) with a downwardly projecting lip is located on a ramp front edge (538). In some embodiments, the attachment ledge (550) sets into and engages the platform edge (430) of the platform member (400);

In some embodiments, the ramp (500) is an expanded metal. In some embodiments, the ramp (500) is a plastic. In some embodiments, the ramp (500) is a composite material, for example, fiberglass.

In some embodiments, the lip of the ramp (500) extends about 1". In some embodiments, the lip of the ramp (500) extends about 1.5". In some embodiments, the lip of the ramp (500) extends about 2".

In some embodiments, upon installation, the rail bottom surface (220) sets on top of, nonslidably interfaces with, and attaches to a horizontal top surface of a side rail (710) of a vehicle (700) so equipped. In some embodiments, upon installation, the rail inside surface (230) sets against, nonslidably interfaces with, and attaches to a vertical inside surface of a side rail (710) of a vehicle (700) so equipped.

In some embodiments, the side stop tie down (250) projects horizontally out and away from the horizontal attachment rail (200). In some embodiments, the side stop tie down (250) is for securing the ramp (500) in a horizontal position. In some embodiments, a plurality of ramps (500) can be secured in a vertically stacked position via the side stop tie down (250). In some embodiments, the side stop tie down (250) is an attachment point for securing a vehicle (700) to the system (100)

In some embodiments, the end of the support beam (300) attachably engages the support beam attachment (240). In some embodiments, the support beam (300) is attachably engaged in a generally horizontally planar position at a ninety degree (right) angle to the horizontal attachment rail (200).

In some embodiments, a first ramp (500) can be connected to a second ramp (500) via the first hinge member (540) and the second hinge member (540b). In some embodiments, a plurality of ramps (500) can be connected in a series via the first hinge members (540a) and the second hinge members (540b).

In some embodiments, the platform member (400) and the ramp (500) are interchangeable. In some embodiments, both the platform member (400) and the ramp (500) have the sliding member (440), the first hinge member (540a), the second hinge member (540b), the platform edge (430), the ramp edge (530), and the attachment ledge (550).

In some embodiments, the system (100) is constructed from a metal.

In some embodiments, the system (100) is attached to the vehicle (700) via clamps. In some embodiments, the system (100) is attached to the vehicle (700) via C-clamps.

In some embodiments, the system (100) is attached to the vehicle (700) via a plurality of bolts, washers and nuts.

In some embodiments, the sliding member (440) is disposed on the bottom surface of the platform member (400) about 6" from the end. In some embodiments, the sliding member (440) is disposed on the bottom surface of the platform member (400) about 12" from the end. In some embodiments, the sliding member (440) is disposed on the bottom surface of the platform member (400) about 18" from the end.

As used herein, the term "about" refers to plus or minus 10% of the referenced number. For example, an embodiment wherein the ramp (500) is about 5 feet in length includes a ramp that is between 4.5 and 5.5 feet in length.

The disclosures of the following U.S. Patents are incorporated in their entirety by reference herein: U.S. Pat. No. 4,874,284; U.S. Pat. No. 5,553,762; U.S. Pat. No. 7,150,591; U.S. Pat. No. 7,455,489; U.S. Pat. Application No. 2008/0014068; U.S. Design Pat. No. D 505,238; U.S. Design Pat. No. D594,171.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A collapsible loading and transporting rack system (100) for transporting a first vehicle (700) on a second vehicle equipped with side rails (710) comprising:
    (a) a plurality of right-angularly cross-sectional attachment rails (200), wherein each attachment rail (200) comprises:
        (i.) a rail top surface (210),
        (ii.) a rail bottom surface (220),
        (iii) a rail inside surface (230),
        (iv) a support beam attachment (240) affixed to the rail top surface (210), and
        (v) a side stop tie down (250) affixed to the rail top surface (210);
    (b) a plurality of support beams (300), wherein each support beam (300) comprises:
        (i) a center beam (310) comprising a hollow cavity and an aperture disposed on an end,
        (ii) an inner beam (320) slidably disposed inside the hollow cavity of the center beam (310), said inner beam (320) having an end, said inner beam (320) slidably projects from and away from the aperture on the end of the center beam (310), and
        (iii) a set screw (600) disposed on the center beam (310), proximal to the end of the center beam (310), wherein said set screw (600) securely engages and affixes the inner beam (320) with respect to the center beam (310), wherein the support beam (300) comprises an adjustable length;
    (c) a plurality of generally rectangular planar platform members (400), wherein each platform member (400) comprises:
        (i) a platform top surface (410),
        (ii) a platform bottom surface (420),
        (iii) a platform edge (430) comprising an upwardly projecting lip around at least one side of the platform edge (430), and
        (iv) a rectangularly cross-sectional sliding member (440) comprising a hollow cavity and an aperture on an end disposed on the bottom surface of the platform member (400) proximal to an end, said sliding member (440) further comprises a set screw (600) disposed on the sliding member (440), proximal to the end, wherein said sliding member (440) slidably attaches to and wraps fully around the support beam (300), wherein said set screw (600) securely engages and affixes a first platform member (400) to the support beam (300) at a specified location with respect to a second platform member (400); and
    (d) a plurality of generally rectangular planar ramps (500), wherein each ramp (500) comprises:
        (i) a ramp top surface (510),
        (ii) a ramp bottom surface (520),
        (iii) a ramp edge (530) comprising an upwardly projecting lip around the ramp edge (530) on a ramp first side edge (532), a ramp second side edge (534), and a ramp back edge (536),
        (iv) a first plurality of circularly cross-sectional hinge members (540a) comprising a hollow cavity and an aperture on an end disposed on the ramp bottom surface (520) proximal to the ramp back edge (536), and a second plurality of circularly cross-sectional hinge members (540b) comprising a hollow cavity and an aperture on an end disposed on the ramp bottom surface (520) proximal to a ramp front edge (538), and
        (v) an attachment ledge (550) comprising a downwardly projecting lip disposed on the ramp front edge (538), wherein the attachment ledge (550) sets into and engages the platform edge (430) of the platform member (400);

wherein, upon installation, said rail bottom surface (220) sets on top of, nonslidably interfaces with, and attaches to a horizontal top surface of a side rail (710) of the first vehicle (700) so equipped, wherein, upon installation, said rail inside surface (230) sets against, nonslidably interfaces with, and attaches to a vertical inside surface of a side rail (710) of the first vehicle (700) so equipped, wherein said side stop tie down (250) projects horizontally out and away from the horizontal attachment rail (200), wherein said side stop tie down (250) is for securing the ramp (500) in a horizontal position, wherein a plurality of ramps (500) can be secured in a vertically stacked position via the side stop tie down (250), wherein said side stop tie down (250) is an attachment point for securing the second vehicle to the system (100), wherein the end of the support beam (300) attachably engages the support beam attachment (240), wherein the support beam (300) is attachably engaged in a generally horizontally planar position at a ninety degree (right) angle to the horizontal attachment rail (200), wherein a first ramp (500) can be connected to a second ramp (500) via the first hinge members (540a) and the second hinge members (540b), wherein a plurality of ramps (500) can be connected in a series via the first hinge members (540a) and the second hinge members (540b), wherein a collapsible loading and transporting rack system (100) is for transporting the first vehicle (700) on the second vehicle equipped with side rails (710).

2. The system (100) of claim 1, wherein the platform member (400) and the ramp (500) are interchangeable.

3. The system (100) of claim 1, wherein the system (100) is constructed from a metal.

4. The system (100) of claim 1, wherein the sliding member (440) is disposed on the bottom surface of the platform member (400) about 6" from the end.

\* \* \* \* \*